(12) United States Patent
Detzner

(10) Patent No.: US 6,513,435 B2
(45) Date of Patent: Feb. 4, 2003

(54) PROCESS FOR MODIFYING AND PRINTING ON THE SURFACE OF A COMPACT SUBSTRATE

(75) Inventor: Peter Detzner, Ellwangen (DE)

(73) Assignee: ISIMAT GmbH Seibdruckmaschinen, Ellwangen (DE)

(*) Notice: Subject to any disclaimer, the term of this patent is extended or adjusted under 35 U.S.C. 154(b) by 0 days.

(21) Appl. No.: 09/838,692

(22) Filed: Apr. 19, 2001

(65) Prior Publication Data

US 2002/0104456 A1 Aug. 8, 2002

(30) Foreign Application Priority Data

Apr. 20, 2000 (DE) .......................... 100 19 926

(51) Int. Cl.[7] .......................... B41F 23/00; B41F 17/18; B41M 1/34
(52) U.S. Cl. .......................... 101/487; 101/35; 101/483; 65/120; 118/72; 427/255.15
(58) Field of Search .......................... 101/35, 36, 38.1, 101/41, 491, 487, 494, 483; 427/452, 223, 255.15, 255.18; 65/30.1, 60.1, 60.8, 120; 118/72, 47

(56) References Cited

U.S. PATENT DOCUMENTS

| 5,142,975 A | * | 9/1992 | Podalsky et al. ........... 101/124 |
| 5,223,852 A | * | 6/1993 | Oresti et al. ................... 101/35 |
| 5,585,153 A |   | 12/1996 | Kamen et al. |
| 6,135,654 A | * | 10/2000 | Jennel ......................... 101/35 |

FOREIGN PATENT DOCUMENTS

| AT | 381 693 B | | 11/1986 |
| DE | 236 516 A1 | | 4/1985 |
| DE | 232 429 A1 | | 1/1986 |
| DE | 236 758 A1 | | 6/1986 |
| DE | 3511720 A1 | | 10/1986 |
| EP | 0 594 171 | | 10/1993 |
| JP | 51-20209 | * | 2/1976 |
| WO | WO 99/20574 | | 4/1999 |

* cited by examiner

Primary Examiner—Leslie J. Evanisko
(74) Attorney, Agent, or Firm—Morriss, Bateman, O'Bryant & Compagni

(57) ABSTRACT

A process for modifying the surface of a solid substrate includes modifying the surface with at least one oxidizing flame and modifying the surface with at least one silicatising flame. The process is particularly beneficial in preparing glass and other surfaces for printing thereon.

24 Claims, 2 Drawing Sheets

PROCESS FOR MODIFYING AND PRINTING ON THE SURFACE OF A COMPACT SUBSTRATE

BACKGROUND

The invention provides for a method for modifying a surface of a solid substrate, in particular glass, ceramic, and/or porcelain as well as substances made by this method.

Solid substrates and materials are used in domestic and industrial applications as well as in research and development. The natural surface of solid substances is not suitable for a number of applications due to heterogeneous structures or porosity.

It is known how to modify the surface of a solid substrate chemically, physically or biologically. The modification can be done using oils, wax or varnish, or by radioactive radiation, sand blasting, or depositing bio-molecules. Chemical modification is widely used in industrial or craft applications. Chemical modification of a surface of an amorphous substance is achieved through the use of liquids, for example aggressive acids or alkalines.

The physical-chemical structure of the top layer, that is to say the layer that is to be modified, determines the coating process. Known methods are acid baths, waxing, flaming or plasma or corona pre-treatment of, for example, un-polarised plastics. The surface can also be modified through depositing a layer of adhesion promoter, for example a conversion layer.

DE3511720 discloses a multi-step process which serves to produce hydrophilic glass surfaces on glass sheets. The sheets are treated with a liquid alkaline phosphate glass cleaner and, after rinsing with water, with a solution containing phosphoric acid.

U.S. Pat. No. 558,515 discloses a process where a printing ink together with a silane adhesion promoter are deposited directly onto a glass surface.

In particular the surfaces of glass, ceramic, porcelain or crystals can be such that due to the surface energy a modification using liquid substances is only limited or not possible at all. The surface energy and the polarity of the surface are the critical factors in moistening with liquids and for the success of the surface modification as well as for the subsequent adhesion of modifying layers that are deposited on the surface.

EP0594171 discloses a process and apparatus for the modification of the surface activity of a silicate glass substrate. Hydrophilisation is achieved by having a silicon-containing coating applied as $SiO_x$ by flame-pyrolytic decomposition of the organosilicon substance(s). This process for modifying silicate glass facilitates subsequent processes such as depositing a layer of varnish.

AT-PS381693 discloses a process to modify the surface of a silicate glass substrate to give it hydrophilic properties through depositing a sulphonate-organosilicon compound on the surface of the substrate and subsequently drying it.

DD 232 429 B1 and DD 236 758 A1 disclose a process where a flame-hydrolysis burner is used under ordinary atmospheric conditions to coat a metallic dental prosthesis part with silicon oxide.

While the prior art discloses processes for the modification of surfaces of solid substrates, in particular surfaces of glass, ceramic, porcelain and others, it is not possible to deliver reproducible, homogeneous surface properties. This is mainly due to the fact that the surface structure of a solid substrate always affects a directly deposited layer of silicon oxide. Local variation in density and chemical modification occur naturally on the surface of the substrate and these cause a variation in the adhesion of the silicon oxide, resulting in an inhomogeneous coating.

When printing ink and silane adhesion promoter are deposited directly onto the surface then this modification of the surface causes a negative interaction between the natural OH-groups on the surface and the silane adhesion promoter. Therefore the non-reproductible, non-homogeneous properties of the surface cause a non-satisfactory adhesion of the modifying layer to the surface.

Attempting a chemical treatment of a glass surface with the objective or providing a uniformly structured and homogeneous surface has the disadvantage, that these treatments can only be applied after the glass ribbon is separated into individual glass sheets so that they can be immersed in an immersion bath. The immersion treatment requires a large apparatus. The hydrophilic coating has organic traces, their interaction with the layers deposited later is undesirable. If the treated surface is part of a container or a pipe, it could also cause undesirable interactions with the solutions being stored in a container or with the liquids being transported through the pipe.

Additional problems can arise with trapped moisture on surfaces on glass-like, solid substrates. The moisture is trapped in gel-films that have a negative affect on the adhesion of the layers to be deposited. A reduction in the gel-film in a homogeneous and reproductible way is not known in the art.

The quality of the modification of the surface also depends on the deposited or generated reactive groups as these form the basis for a strong adhesion of the subsequently deposited layers. The known processes do not achieve a sufficient density of reactive OH-Groups, this results in reduced adhesion of the subsequently deposited layers.

SUMMARY OF THE INVENTION

The technical problem addressed by the invention is to provide a process that modifies the amorphous surfaces of solid substrates, in a way that produces reproducible, homogeneous surfaces with a high density of reactive OH-Groups and simultaneously creates a micro-retentive surface by reducing the gel-film.

The invention solves the technical problem by providing a process for modifying a surface of an amorphous substance; this process comprises the following steps:

Modification of the surface with at least one oxidising flame; and

Modification of the surface with at least one silicatising flame.

This combined treatment of a surface with at least one oxidising and at least one silicatising flame produces a homogeneous, micro-retentive surface with a high density of reactive groups.

The invention provides for a process that has the advantage of reducing the moisture that is present as non-homogeneous gel-films on the amorphous surface of solid substrates.

Surprisingly, the process reduces the gel-film in a way that is reproducible. The gel-film properties are determined by the existing amorphous structure and the age of the gel-film. In the first step of the process, the oxidising flame reduces the gel-film and the trapped moisture. The reduction of the gel-film provides reproducible, homogeneous surface properties.

In the second step, a surface created during the first step is treated with a silicatising flame and a silicon oxide layer is deposited. The layer thickness is up to 60 nm, preferably 5 to 50 nm, more preferably 10 to 30 nm and the layer is characterised by a high density of reactive OH-groups. The uniformity and excellent adhesion properties of the deposited layer of silicon oxide are derived through the combination of the first and second step of the process. It is advantageous to select a number of flames so that 1 to 5 oxidising and silicatising flames modify the surface. Preferably, the flame temperature is in the range 900° C. to 1200° C. and the solid substance is heated up to 50° C. and 100° C. Preferably, flaming continues for the duration of 0.1 sec to 5 sec, more preferably for the duration of 0.1 sec to 1 sec.

The reactive groups are the chemical basis for a strong chemical adhesion of the subsequently deposited, surface modifying layers, such as layers of wax, varnish or ink.

When the amorphous substance is glass, then the resulting density of OH-groups on solid surfaces treated by the present invention is 2 to 5 times higher than on untreated surfaces.

The silicon oxide layer or silicate layer deposited during the second step exhibits a sub-microscopic roughness. This roughness enables a significantly improved adhesion of all subsequently deposited layers. The oxidising and the silicatising process steps produce a reproducible, homogeneous, micro-retentive surface. The combination of both process steps surprisingly gives a reduction in the gel-film and an increase in density and a homogeneous distribution of reactive OH-groups.

According to the invention, an oxidising flame is any inflammable gas, air-gas mixture, aerosol or spray that has a surplus of oxygen and/or can oxidise.

According to the invention, a silicatising flame is any inflammable gas, gas-air mixture, aerosol or spray that by flame-pyrolytic decomposition of a silicon-containing substance deposits a layer of silicon oxide on the surface. In particular, it is possible to provide for the depositing of a silicon-containing layer that in the main free is of carbon, and to add during the flame pyrolyse silicon alkoxisilan, as the substance containing silicon, to the mixture of air, inflammable gas and, if required, oxygen. The inflammable gas could be propane, butane, town gas or natural gas.

An advantageous expository example of the invention is the depositing of at least one layer of printing ink on the surface of an amorphous substance. Advantageously, the roughness and the good adhesion properties of the silicate layer result in an excellent adhesion of the printing ink. Direct printing on the surface of the substances reduces energy cost compared with the existing process of printing with ceramic enamels that have to be fired in an annealing lehr. Advantageously, the inks deposited on the silicate layer are scratch and rub resistant and have a high resistance to water or steam. The homogenous silicate layer has the advantage of making it possible to deposit very thick layers of printing inks.

The properties of printing inks such as hue, saturation, metamerism, coverage, and transparency are freely selectable when the inks are to be applied to a surface that has been treated according to the invention.

Another advantageous expository example of the invention is the depositing of printing ink by screen printing, planographic printing, gravure printing, offset printing, or flexographic printing and/or letter printing. Depositing at least one printing ink can be accomplished either by direct or indirect colouring or by photo-mechanic, electro-static printing processes. Advantageous are printing processes that utilise a printing forme where the printing parts are elevated from the non-printing parts, printing processes where printing and non-printing parts are on the same level, printing processes where the printing parts are indented, and printing processes with a printing forme that consists of a stencil and a material which is permeable for printing ink. Advantageous is a printing process for depositing inks, where the printing parts of the printing forme are permeable for printing inks. For example, the printing ink is forced through a screen onto the surface that is to be printed on. According to the invention, the direct printing process includes screen printing and electrostatic printing.

In another advantageous expository example the printing ink is chosen from a group comprising inorganic pigments, metal pigments, interference pigments, organic pigments, soluble organic dyestuffs, and/or UV colorants. The pigments could be synthetic or natural, mineral, organic, plant or animal pigments. Inorganic pigments include, amongst others, titanium oxide (white), iron oxide, or lead chromate and lead molybdate. Metal pigments include aluminium, brass, bronze, etc. According to the invention, interference pigments are, for example, mother-of-pearl pigment, pearlescent pigment, and bronze pigments. Carbon black pigments are used in black printing inks. The advantages of organic pigments are high colour strength, defined hue, transparency, gloss, high wettability, colour-fastness, heat resistance, chemical resistance and colour fastness when varnished. Organic soluble dyestuffs are very pure and have a high colour strength. UV inks can be cured very quickly when exposed to UV light and this requires comparable little energy. In addition, UV inks allow high printing speeds and high definition and therefore provide for a very efficient production of printed surfaces.

In a particular advantageous expository example of the invention, organic pigments are selected from the group comprising azo pigments, isoindulin pigments, phthalocyanine pigments, special poly-cyclic pigments, pigments based on basic salts, luminescence pigments, dayglow pigments and/or nightglow pigments. The advantages of organic are good colour fastness, light fastness, durability, gloss, high colour strength, high colour, and the use of organic pigments is cost effective. Their use is advantageous for modifying hue, for trade marks, for advertising, or as an example for bronze effects.

Another example of an advantageous expository example of the present invention is when printing inks have fillers selected from the group comprising calcium carbonate, aluminium oxide hydrate, barium sulphate, silicon dioxide, aluminium silicate and/or magnesium silicate. According to the invention, fillers are additives that increase the viscosity of the ink without increasing its tack. The filler prevents the settling of pigments in liquid inks or absorption of inks on porous surfaces as well as set off in the stack. According to the present invention, filler comprise binder, solvent, thinner, and additives. Binders such as resins or oils wrap the pigments during the dispersion process, achieving an even distribution of smallest particles in a dispersion or a dissolving of dyestuffs. Binders positively affect the transfer of pigments in a printing machine or during ink transfer and adhesion of pigments on a surface after drying. Solvents amongst others hydrocarbons, mineral oils, alcohols, glycols, glycol ether, esters, ketones, water, acetone, benzine, butanone, cyclohexanone, toluene, xylene, benzole, ethanol and/or vegetable oils—directly influence the viscosity of printing inks. The rate at which a solvent evaporates determines the drying of the ink, in particular for gravure, flexo, screen and tampon printing inks and offset printing inks. Preferably, solvents have drying oils added, that cause the ink to dry by oxidation after the completion of the printing process, and also additives for reducing solvent residues in the ink film. According to the invention additives are all substances that are added in order to modify properties of the printing inks in a targeted way. Waxes are added as slip compounds in order to reduce friction and improve scuff resistance and moisture resistance. It is an advantage to use amides of fatty acids for increasing the rub resistance and surface smoothness. According to the invention, part of the additives are softeners, drying oil, retarder, wetting agent, neutralising agent, plymerisation agent, photo initiators, and anti foaming agent.

According to the invention, an amorphous substance could be a glass, a melt, a glass-ceramic, a ceramic and/or a crystal or any other solid that has a surface coated with glass, melt, glass-ceramic, ceramic and/or crystal. According to the invention, amorphous substances are substances that do not have an extended ordered arrangement of the constituent molecules or ions and are thus without crystalline form. Their structure is similar to liquids, and amorphous substances can be considered as liquids with extremely high viscosity or as being supercooled. Amorphous substances are, for example, amorphous metals, amorphous silicon, glass, melts, glass-ceramics, and others. According to the invention, glass comprises every inorganic, preferably oxidic molten substance that has changed to a solid state through freezing. According to the invention, Glass is also organic glass, for example acrylic glass, cellophane or similar; i.e. the fact that the components of the melt have not crystallised is not a necessary characteristic for glass according to the invention. According to the invention, glass-ceramics are solids with partially crystallised structures that were produced through ceramming, i.e. a precursor glass of specific chemically composition is subjected to an adapted heat process that causes controlled crystallisation. Crystallisation can also be initiated through radiation. Glass-ceramic substances and ceramic substances have preferably a crystal phase dispersed within a glassy matrix. According to the invention, other glass-ceramics, are poly-crystal, silica-free substances of oxides or oxide compounds that have additives to assist sintering or provide for certain properties. The poly-crystal, silica-free substances are preferably produced by ceramic methods.

The amorphous substance could be a sintered substance made from clays, carbides, nitrites, oxides and silicides. Products made from clay substances are, for example, ceramics, laboratory porcelain, bone china, permanent magnets, silica, magnesia, as well as wall tiles, pottery clay and others.

It can be an advantage to use glass, melt, glass-ceramic, ceramic, and/or crystal for coating of any solids or materials.

The surface of any material or metal or glass solid can consist of a glass-like, solidified melt, the greater part of the melt is made up of oxides. These kinds of melts are called enamels and have a high chemical, thermal and mechanical resistance.

Another expository example is a solid that is the surface of a PET produce.

Another preferred expository example of the invention is a PET product made into a bottle.

In a particular advantageous expository example of the invention, the amorphous substance is lime soda glass, borosilicate glass, sodium-silicate glass, silica glass or silica-free glass, in particular phosphorus glass. Advantageously, the amorphous substance consists of a frozen melt of silicon dioxide, calcium oxide, sodium oxide, in particular with a part of boron trioxide, aluminium oxide, lead oxide, magnesium oxide, barium oxide, calcium oxide, and others.

In another expository example, glass is a glass sheet, a container, hollowware, a domestic glass, glass of a light bulb, a television tube, a laboratory glass, a lead crystal glass, a fibre glass, a jewellery glass, a frosted glass, a coloured glass, decorative glass and/or an optical glass.

Further expository examples of the invention are in the description.

The invention will now be described with reference to the accompanying drawing in which:

and

Figure 4:
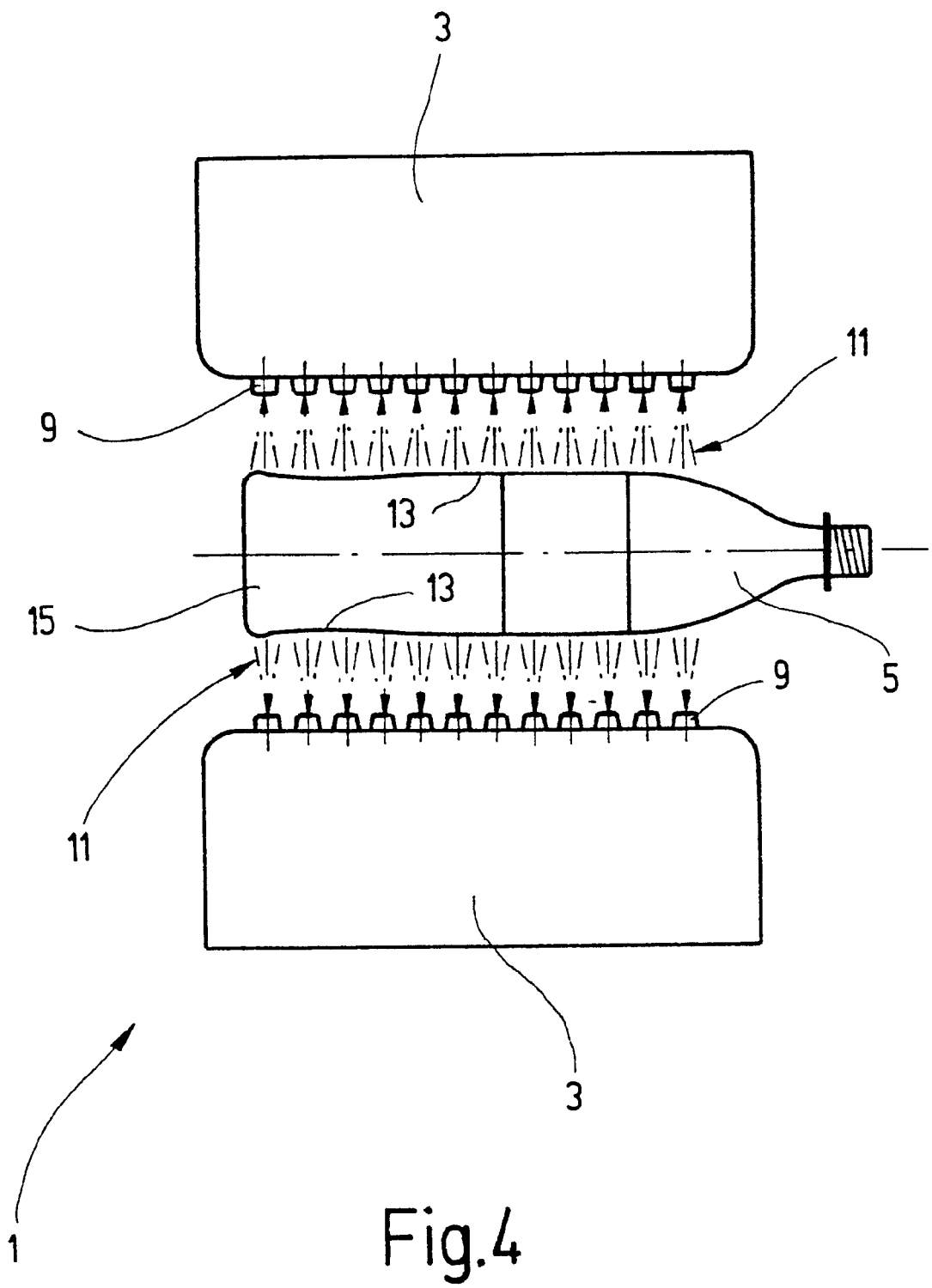

FIG. 4 shows a schematic diagram of a hollow object and two burners.

DETAILED DESCRIPTION

Figure 1:
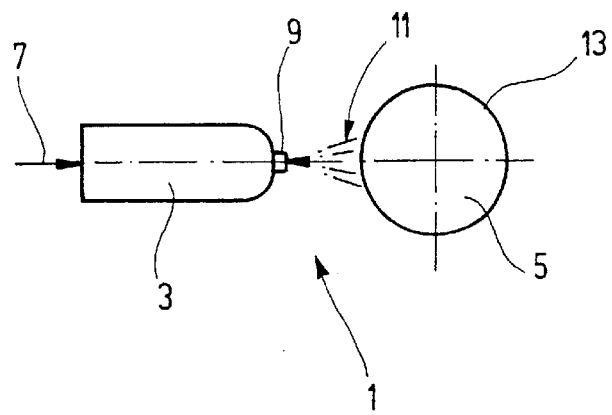
FIG. 1 shows a schematic diagram of an amorphous substance and one burner.

FIG. 1 shows a surface modification unit 1, it comprises a burner 3 and a solid substrate 5. The burner has feeding pipes (they are not shown in the diagram) through which inflammable gases, air, and if required, organosilicon substances are fed as indicated by the arrow 7. The inflammable gases include propane, butane, town gas and/or natural gas. The inflammable gases, the air as well as the other substances form a combustible mixture 11 that leaves the burner 3 through a jet 9 and is deposited on the surface 13 of the solid substrate 5. During the first step a mixture of inflammable gas and air is fed to the burner 3 as indicated by arrow 7, the mixture forms a combustible mixture after leaving the jet 9 and burns with an excess of oxygen. The combustible mixture is therefore oxidising. It is feasible to have one jet 9 associated with a burner 3, but it is also possible that a burner 3 has several jets in line. The oxidising combustible mixture 11 oxidises and desorbs organic impurities on the surface 13 and reduces moisture films sticking to the surface 13. The compact substrate 5 has a cross section that is symmetric with regard to its axis of rotation. The compact substrate 5 rotates during flaming. It is also conceivable that the burner 3 rotates around the solid substrate 5. The surface 13 moves under the burner 3 with a speed of up to 70 m/min.

During the second step an air-gas-mixture is fed to the burner 3 that contains tetramethoxisilan. The tetramethoxisilan is added in a mole fraction of $10^{-2}$ to $10^{-6}$. The range of ratios of inflammable gas volume to air volume is between 1 to 3 and 1 to 80. The mixture leaves the jet 9 as combustible mixture 11 burns with a silicatising flame. During this process, called flame pyrolysis, a layer of silicon oxide is deposited on the surface 13. Several layers of $SiO_x$, but at least one layer of $SiO_x$, are deposited on the surface 13 by means of several repetitive flame pyrolytic applications. The resulting coating contains silicon and has a thickness, depending on the number of layers, of 1 to 100 nm. Due to the slow surface speed of the solid substrate of up to 70 m/min the silicon rich coating is deposited almost perfectly homogeneous, resulting in an even hydrophilisation of the surface 13. The final silicate layer is characterised by a high proportion of a reactive OH-groups. The distribution of the OH-groups is almost even across the complete surface 13, as the oxidising treatment during the first process step achieved a homogeneous surface in preparation for the second process step.

Figure 2:
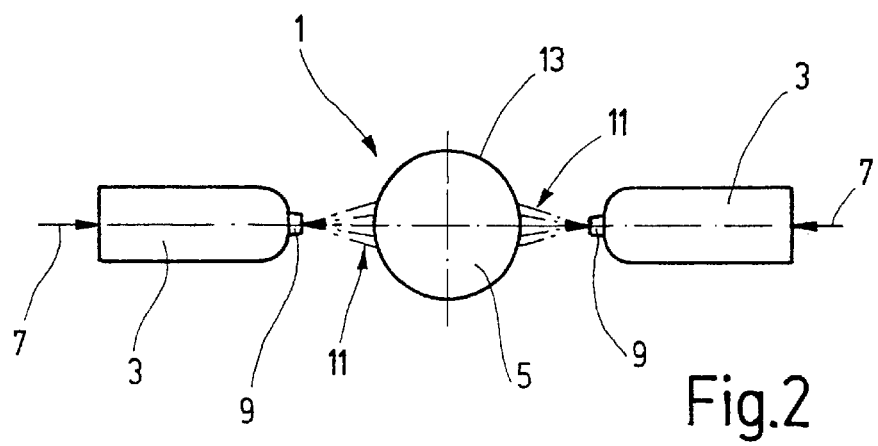
FIG. 2 shows a schematic diagram of an amorphous substance and two burners.

FIG. 2 shows another expository example, a surface modification unit 1, that in the main is built like the surface modification unit 1 in FIG. 1. The description follows the previous one and only differences are detailed. In contrast to the expository example according to FIG. 1, the surface modification unit 1 consists of two burners 3. The burners 3 are positioned so that they are in a common line with the centre of the solid substrate 5. The burners 3 are positioned at equal distances to the surface 13. The distance between jet 9 and surface 13 is 30 to 150 mm. It is possible to supply the burners 3 in a way that one burner 3 acts oxidising, the other acts silicatising. It is also feasible to have both burners 3 modifying the surface 13 with an oxidising flame during the first step of the process and during the second step with a silicatising flame. The amorphous substance rotates with a surface speed of up to 70 m/min around its axis of rotation. The surface 13 is evenly exposed to flame pyrolytic treatment during the rotation.

Figure 3:
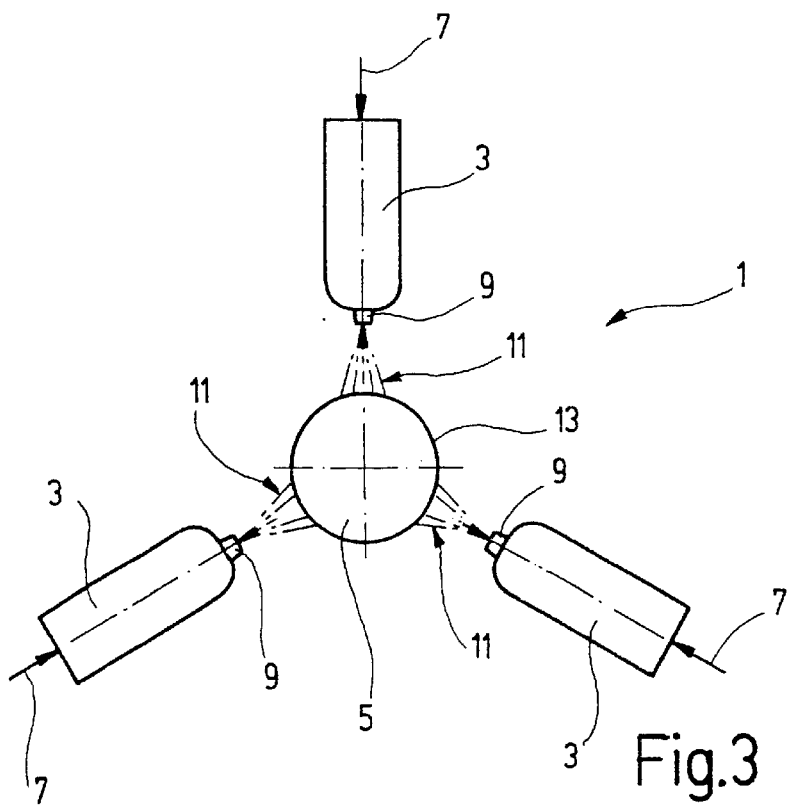
FIG. 3 shows a schematic diagram of an amorphous substance and three burners.

FIG. 3 shows another expository example of a surface modification unit 1 that is very similar to the surface modification unit 1 in FIG. 2. The difference is that instead of two burners 3 three burners 3 are positioned radially around the solid substrate 5. The burners 3 can be positioned so that the angle between the centre lines of two adjacent burners 3 is 120°; but any other positioning is also possible.

FIG. 4 shows a schematic diagram of a side view of a surface modification unit 1 that is constructed in a similar way to surface modification unit 1 in FIG. 1. The solid substrate 5 is a hollow body 15. The jets 9 of the burner 3 are arranged along the length of the burner 3 so that they can modify almost the complete length of the hollow body 15. The surface 13 of the hollow body 15 and the burners 3 move relative to each other such that the complete surface 13 is modified by the oxidising flame that reduces the gel-film on the surface 13 and oxidises and desorbs impurities during the first step of the process. The resulting pre-treated, cleaned and homogeneous surface 13 is treated with a silicatising flame during the second step of the process that deposits an SiO$_2$ coating of 10 to 30 nm thickness.

What is claimed is:

1. A process for modifying the surface of a solid substrate; this process comprising:
   modifying the surface with at least one oxidising flame;
   modifying the surface with at least one silicatising flame; and
   depositing a printing ink on the surface of the solid substrate.

2. The process according to claim 1, wherein the printing ink is selected from the group consisting of a liquid, a paste, a powder, an aerosol, a spray and combinations thereof.

3. The process according to claim 1, wherein the printing ink has fillers selected from from at least one of the group consisting of calcium carbonate, aluminium oxide hydrate, barium sulphate, silicon dioxide, aluminium silicate and magnesium silicate.

4. The process according to claim 1, wherein the printing ink is deposited on the surface by a printing process selected from the group consisting of screen printing, planographic printing, offset printing, gravure printing, flexographic printing and letter printing.

5. The process according to claim 4, wherein the printing ink is selected from a group consisting of inorganic pigments, mineral pigments, metal pigments, interference pigments, carbon pigments, organic pigments, soluble organic dyestuffs and UV colorants.

6. The process according to claim 5, wherein the organic pigments are selected from the group consisting of azo pigments, isoindulin pigments, phthalocyanine pigments, special poly-cyclic pigments, pigments based on basic salts, luminescence pigments, dayglow pigments and nightglow pigments.

7. The process according to claim 4, wherein the printing ink has fillers selected from the group consisting of calcium carbonate, aluminium oxide hydrate, barium sulphate, silicon dioxide, aluminium silicate and magnesium silicate.

8. The process according to claim 1, wherein the solid substrate is selected from the group consisting of a glass, a melt, a glass-ceramic, a ceramic, a crystal and other solids that have a surface coated with at least one of the group consisting of glass, melt, glass-ceramic, ceramic and crystal.

9. The process according to claim 8, wherein the glass is selected from the group consisting of a glass sheet, a container, hollowware, a domestic glass, glass of a light bulb, a television tube, a laboratory glass, a lead crystal glass, a fibre glass, a jewellery glass, a frosted glass, a coloured glass, a decorative glass and an optical glass.

10. The process according to claim 1, wherein the solid substrate is a PET product.

11. The process according to claim 10, wherein the PET product is a bottle.

12. The process according to claim 1, wherein the solid substrate is selected from the group consisting of lime soda glass, borosilicate glass, sodium-silicate glass, silica glass and silica-free glass, and a phosphorus glass.

13. The process according to claim 12, wherein the glass is selected from the group consisting of a glass sheet, a container, hollowware, a domestic glass, glass of a light bulb, a television tube, a laboratory glass, a lead crystal glass, a fibre glass, a jewellery glass, a frosted glass, a coloured glass, a decorative glass and an optical glass.

14. A process for modifying the surface of a solid substrate; this process comprising:
   modifying the surface with at least one oxidising flame;
   modifying the surface with at least one silicatising flame; and
   printing on the modified surface.

15. The process according to claim 14, wherein the method comprises printing on the modified surface with a printing ink selected from the group consisting of a liquid, a paste, a powder, an aerosol, a spray and combinations thereof.

16. The process according to claim 15, wherein the printing ink has fillers selected from at least one of the group consisting of calcium carbonate, aluminium oxide hydrate, barium sulphate, silicon dioxide, aluminium silicate and magnesium silicate.

17. The process according to claim 15, wherein the printing ink is selected from a group consisting of inorganic pigments, mineral pigments, metal pigments, interference pigments, carbon pigments, organic pigments, soluble organic dyestuffs and UV colorants.

18. The process according to claim 14, wherein the method comprises printing on the surface by a process selected from the group consisting of screen printing, planographic printing, offset printing, gravure printing, flexographic printing and letter printing.

19. The process according to claim 14, wherein the solid substrate is selected from the group consisting of a glass, a melt, a glass-ceramic, a ceramic, a crystal and other solids that have a surface coated with at least one of the group consisting of glass, melt, glass-ceramic, ceramic and crystal.

20. The process according to claim 19, wherein the glass is selected from the group consisting of a glass sheet, a container, hollowware, a domestic glass, glass of a light bulb, a television tube, a laboratory glass, a lead crystal glass, a fibre glass, a jewellery glass, a frosted glass, a coloured glass, a decorative glass and an optical glass.

21. The process according to claim 14, wherein the solid substrate is a PET product.

22. A process for printing on a bottle, the process comprising:

subjecting a surface of the bottle to at least one oxidising flame;

subjecting the surface of the bottle to at least one silicatising flame; and printing on the surface.

23. The process according to claim 22, wherein the bottle is made from glass.

24. The process according to claim 22, wherein the bottle is made from plastic.

* * * * *